US008020817B2

(12) United States Patent
Yu

(10) Patent No.: US 8,020,817 B2
(45) Date of Patent: Sep. 20, 2011

(54) MUSICAL INSTRUMENT STAND HAVING HOLDING FUNCTION

(76) Inventor: Tsung-Yao Yu, Daya Township, Taichung County (TW)

( * ) Notice: Subject to any disclaimer, the term of this patent is extended or adjusted under 35 U.S.C. 154(b) by 386 days.

(21) Appl. No.: 12/356,771

(22) Filed: Jan. 21, 2009

(65) Prior Publication Data

US 2010/0181441 A1 Jul. 22, 2010

(51) Int. Cl.
*F16L 3/00* (2006.01)
*G10D 3/00* (2006.01)

(52) U.S. Cl. ............... 248/125.8; 248/125.9; 248/219.2; 248/170; 84/327; 84/329

(58) Field of Classification Search .................. 248/121, 248/125.8, 125.9, 170, 219.2, 316.8, 611; 84/290, 327, 329
See application file for complete search history.

(56) References Cited

U.S. PATENT DOCUMENTS

| | | | | |
|---|---|---|---|---|
| 1,713,673 | A * | 5/1929 | Nelson | 248/173 |
| 6,036,159 | A * | 3/2000 | Yu | 248/443 |
| 6,209,829 | B1 * | 4/2001 | Yu | 248/122.1 |
| 6,316,706 | B1 * | 11/2001 | Sammons | 84/327 |
| 6,375,135 | B1 * | 4/2002 | Eason et al. | 248/166 |
| 6,513,768 | B1 * | 2/2003 | Hsieh | 248/121 |
| 7,423,209 | B2 * | 9/2008 | Chen | 84/327 |
| 7,628,369 | B2 * | 12/2009 | Chen | 248/354.3 |
| 7,717,378 | B2 * | 5/2010 | Yu | 248/166 |
| 2005/0011337 | A1 * | 1/2005 | Hsieh | 84/327 |
| 2006/0213351 | A1 * | 9/2006 | Hsieh | 84/327 |
| 2008/0265116 | A1 * | 10/2008 | Chen | 248/291.1 |
| 2009/0151538 | A1 * | 6/2009 | Lippert et al. | 84/327 |

* cited by examiner

*Primary Examiner* — Terrell McKinnon
*Assistant Examiner* — Eret McNichols
(74) *Attorney, Agent, or Firm* — Alan Kamrath; Kamrath & Associates PA

(57) ABSTRACT

A musical instrument stand includes a top seat including a seat body and a holding unit. The holding unit includes two pivot members, a torsion spring, and two holding rods. Thus, when the musical instrument is pulled upward relative to the holding unit to detach from the two holding rods of the holding unit, the two pivot members of the holding unit are pushed upward by the restoring force of the torsion spring so that the two pivot members of the holding unit are moved upward to the expanding position, and the two holding rods of the holding unit are moved to space from each other such that the neck of the musical instrument can be removed from the two holding rods of the holding unit easily and conveniently.

12 Claims, 16 Drawing Sheets

MUSICAL INSTRUMENT STAND HAVING HOLDING FUNCTION

BACKGROUND OF THE INVENTION

1. Field of the Invention

The present invention relates to a stand and, more particularly, to a musical instrument stand.

2. Description of the Related Art

A conventional musical instrument stand 1 in accordance with the prior art shown in FIG. 16 comprises a base 11, a main rod 12 mounted on the base 11, and a top seat 13 mounted on the top of the main rod 12. The base 11 includes a support rod 111, two auxiliary support rods 112 pivotally connected with the support rod 111, and two support brackets 113 pivotally connected with the two auxiliary support rods 112 and disposed in the horizontal direction "X". The top seat 13 includes a U-shaped fixing bracket 131 mounted on the bent top of the main rod 12, and a movable bar 132 mounted on the fixing bracket 131 and having a first end provided with a pivot portion 133 pivotally mounted on a first end of the fixing bracket 131 and a second end provided with a locking portion 134 detachably locked onto a second end of the fixing bracket 131. When in use, after the locking portion 134 of the movable bar 132 is unlocked from the second end of the fixing bracket 131, the movable bar 132 of the top seat 13 is pivoted relative to the fixing bracket 131 of the top seat 13 in the direction "A". Then, the neck of a musical instrument 100, such as a guitar, is placed into the fixing bracket 131 of the top seat 13, and the bottom of the musical instrument 100 is supported by the two support brackets 113. Then, the movable bar 132 of the top seat 13 is pivoted relative to the fixing bracket 131 of the top seat 13 in the opposite direction, so that the locking portion 134 of the movable bar 132 is locked onto the second end of the fixing bracket 131 to limit the neck of the musical instrument 100 between the fixing bracket 131 and the movable bar 132 of the top seat 13. However, a user has to lock or unlock the movable bar 132 of the top seat 13 so as to position or remove the neck of the musical instrument 100, thereby causing inconvenience to the user when taking the musical instrument 100.

BRIEF SUMMARY OF THE INVENTION

In accordance with the present invention, there is provided a musical instrument stand, comprising a top seat including a seat body and a holding unit pivotally connected with the seat body to hold a neck of a musical instrument. The holding unit of the top seat includes two pivot members pivotally connected with each other, a torsion spring biased between the two pivot members, and two holding rods each mounted on a respective one of the two pivot members to move in concert with the respective pivot member and to hold the neck of the musical instrument.

The primary objective of the present invention is to provide a musical instrument stand having holding function.

Another objective of the present invention is to provide a musical instrument stand, wherein the holding unit holds the neck of the musical instrument, and the support unit supports the bottom of the musical instrument, so that the musical instrument is positioned on the musical instrument stand solidly and stably.

A further objective of the present invention is to provide a musical instrument stand, wherein when the musical instrument is pulled upward relative to the holding unit to detach from the two holding rods of the holding unit, the two pivot members of the holding unit are pushed upward by the restoring force of the torsion spring of the holding unit so that the two pivot members of the holding unit are moved upward to the expanding position, and the two holding rods of the holding unit are moved to space from each other such that the neck of the musical instrument can be removed from the two holding rods of the holding unit easily and conveniently.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
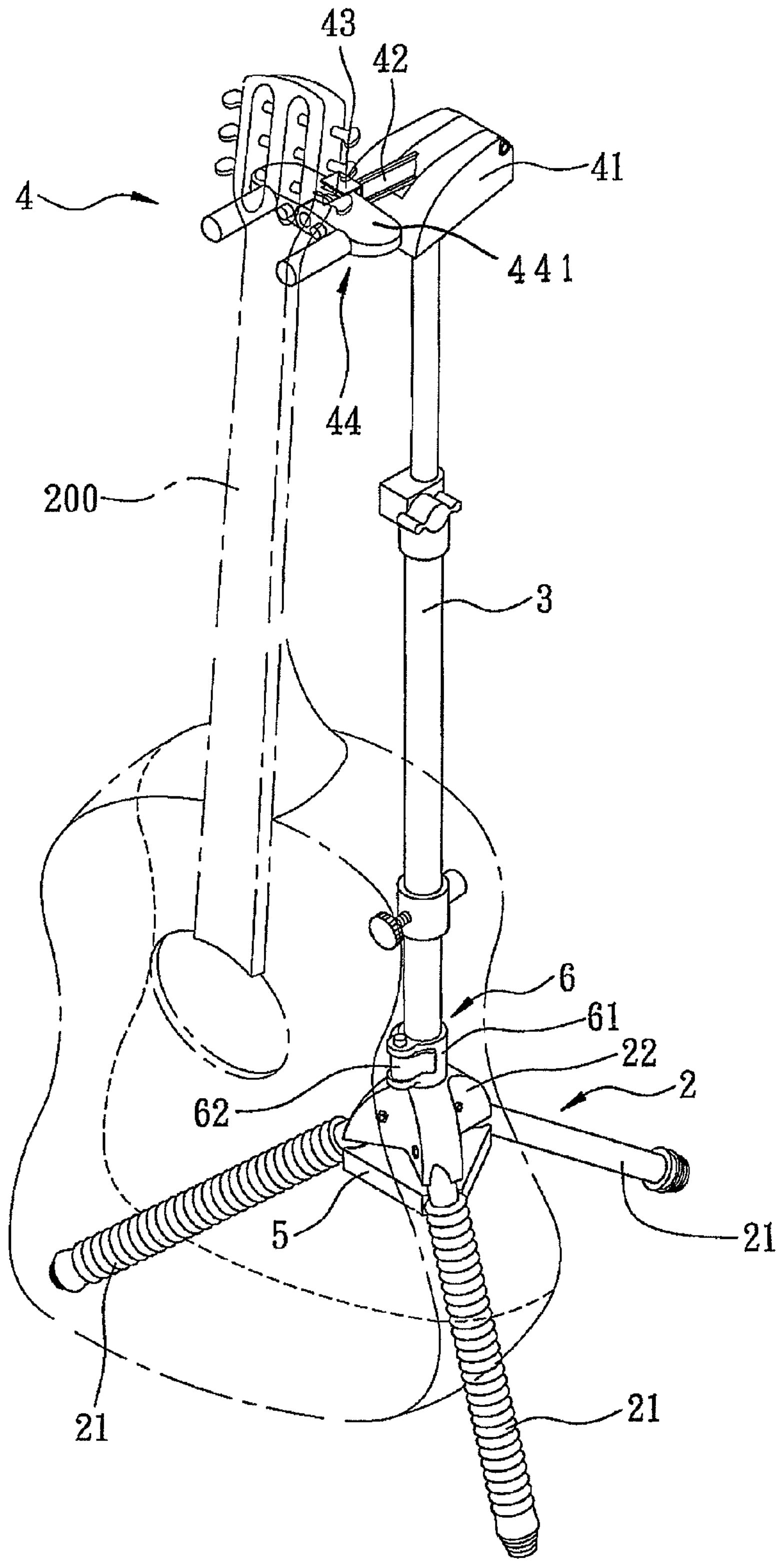
FIG. 1 is a perspective view of a musical instrument stand in accordance with the preferred embodiment of the present invention.
Figure 2:
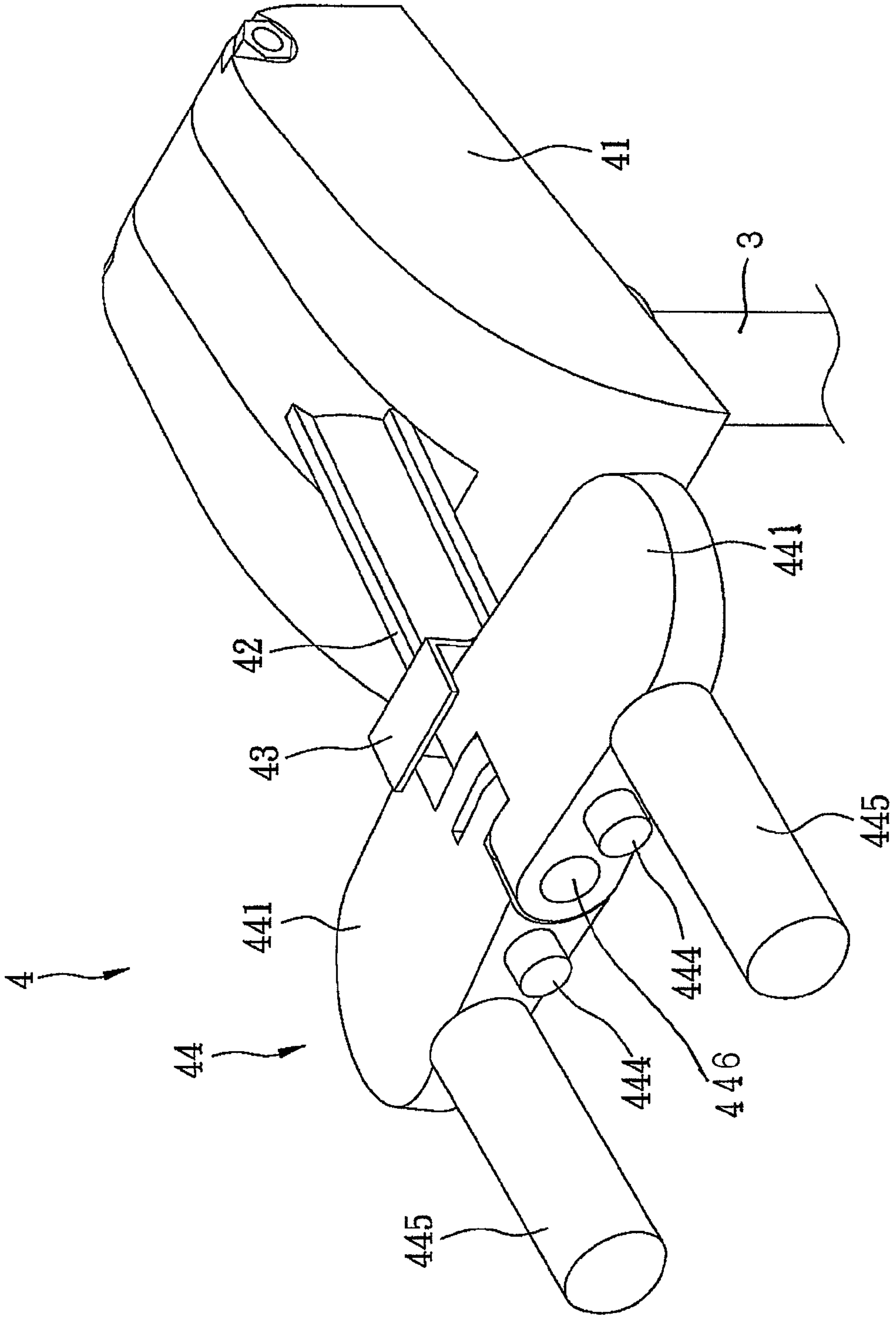
FIG. 2 is a locally perspective enlarged view of the musical instrument stand as shown in FIG. 1.
Figure 3:
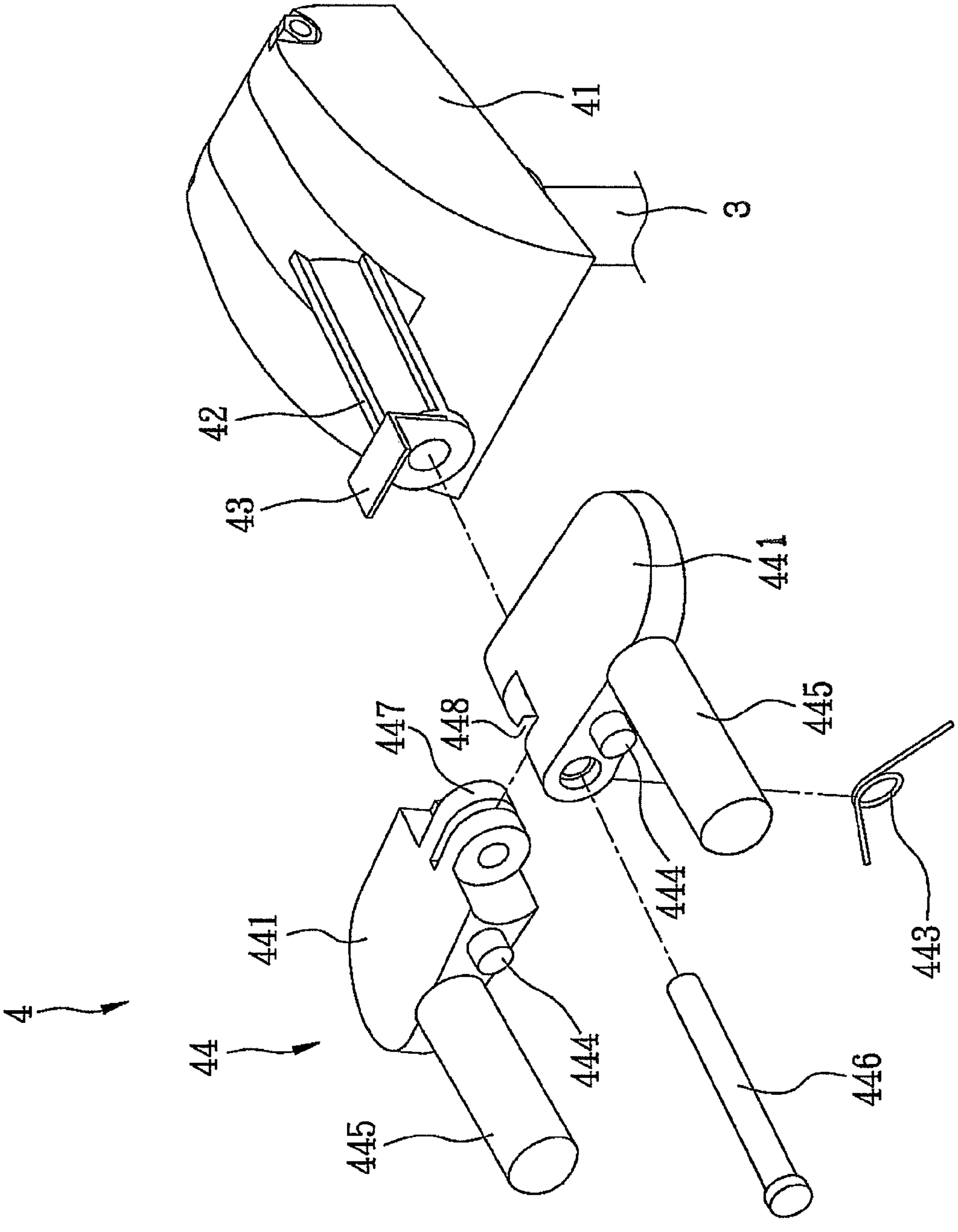
FIG. 3 is an exploded perspective view of the musical instrument stand as shown in FIG. 2.

Referring to the drawings and initially to FIGS. 1-5, a musical instrument stand in accordance with the preferred embodiment of the present invention is used to support a musical instrument 200 and comprises a base 2, a main rod 3, a top seat 4, an urging member 5, and a quick release 6. In the preferred embodiment of the present invention, the musical instrument 200 is a guitar or other musical instrument.

The base 2 is used to support the bottom of the musical instrument 200 and includes a mounting member 22 and a plurality of support legs 21 each pivotally mounted on the mounting member 22. The mounting member 22 of the base 2 is located between the support legs 21 of the base 2. The main rod 3 is mounted on the base 2.

The top seat 4 is mounted on the top of the main rod 3 to support a neck of the musical instrument 200. The top seat 4 includes a seat body 41, and a holding unit 44 pivotally connected with the seat body 41 to hold the neck of the musical instrument 200. The top seat 4 further includes an extension bar 42 pivotally and foldably mounted on the seat body 41 and located between the seat body 41 and the holding unit 44 to support the holding unit 44, and a limit member 43 mounted on the extension bar 42 and located above the holding unit 44 to limit movement of the holding unit 44.

The holding unit 44 of the top seat 4 is pivotally mounted on the extension bar 42 of the top seat 4 and includes two pivot members 441 pivotally connected with each other, a torsion spring 443 biased between the two pivot members 441, two holding rods 445 each mounted on a respective one of the two pivot members 441 to move in concert with the respective pivot member 441 and to hold the neck of the musical instrument 200, a pivot rod 446 extending through the two pivot members 441 to pivotally connect the two pivot members 441, and two cushion pads 444 each mounted on a respective one of the two pivot members 441 to provide a cushioning effect to the musical instrument 200.

Each of the two pivot members 441 of the holding unit 44 has a bottom provided with a protruding limit boss 449 (see FIG. 4) abutting the torsion spring 443. A first one of the two pivot members 441 of the holding unit 44 has a side provided with a receiving recess 448, and a second one of the two pivot members 441 of the holding unit 44 has a side provided with a protruding pivot ear 447 inserted into and pivotally mounted in the receiving recess 448 of the first one of the two pivot members 441. The pivot rod 446 of the holding unit 44 extends through the receiving recess 448 of the first one of the two pivot members 441 and the pivot ear 447 of the second one of the two pivot members 441. The pivot rod 446 of the holding unit 44 has a distal end inserted into and secured in the extension bar 42 of the top seat 4. The pivot rod 446 of the holding unit 44 is located between the two holding rods 445 and is located between the two cushion pads 444. The pivot rod 446 of the holding unit 44 is located between the two pivot members 441 to function as a pivot fulcrum of the two pivot members 441. The two cushion pads 444 of the holding unit 44 are located between the two holding rods 445. The torsion spring 443 of the holding unit 44 is mounted on the pivot rod 446.

The seat body 41 of the top seat 4 is secured on the top of the main rod 3. The limit member 43 of the top seat 4 is integrally formed on and extends outwardly from the extension bar 42. The limit member 43 of the top seat 4 has a substantially inverted L-shaped profile. The limit member 43 of the top seat 4 is located above the two pivot members 441 of the holding unit 44 and spaced from a top of each of the two pivot members 441 of the holding unit 44 to limit movement of the two pivot members 441 of the holding unit 44.

Figure 4:
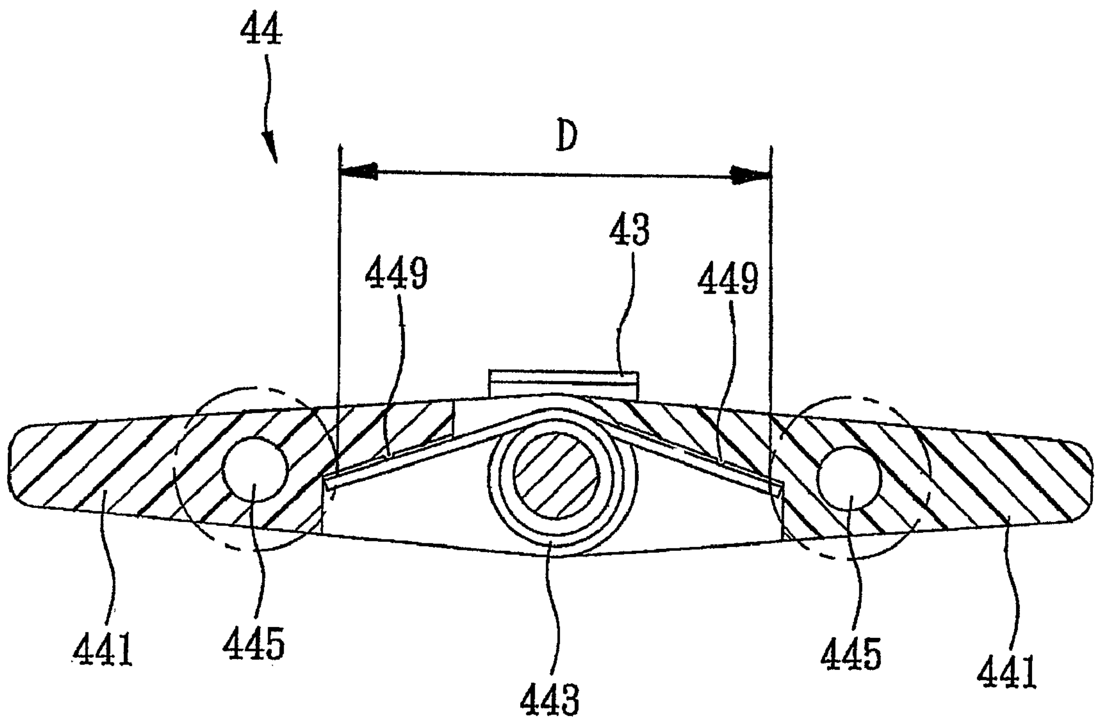
FIG. 4 is a front cross-sectional view of the musical instrument stand as shown in FIG. 2.
Figure 5:
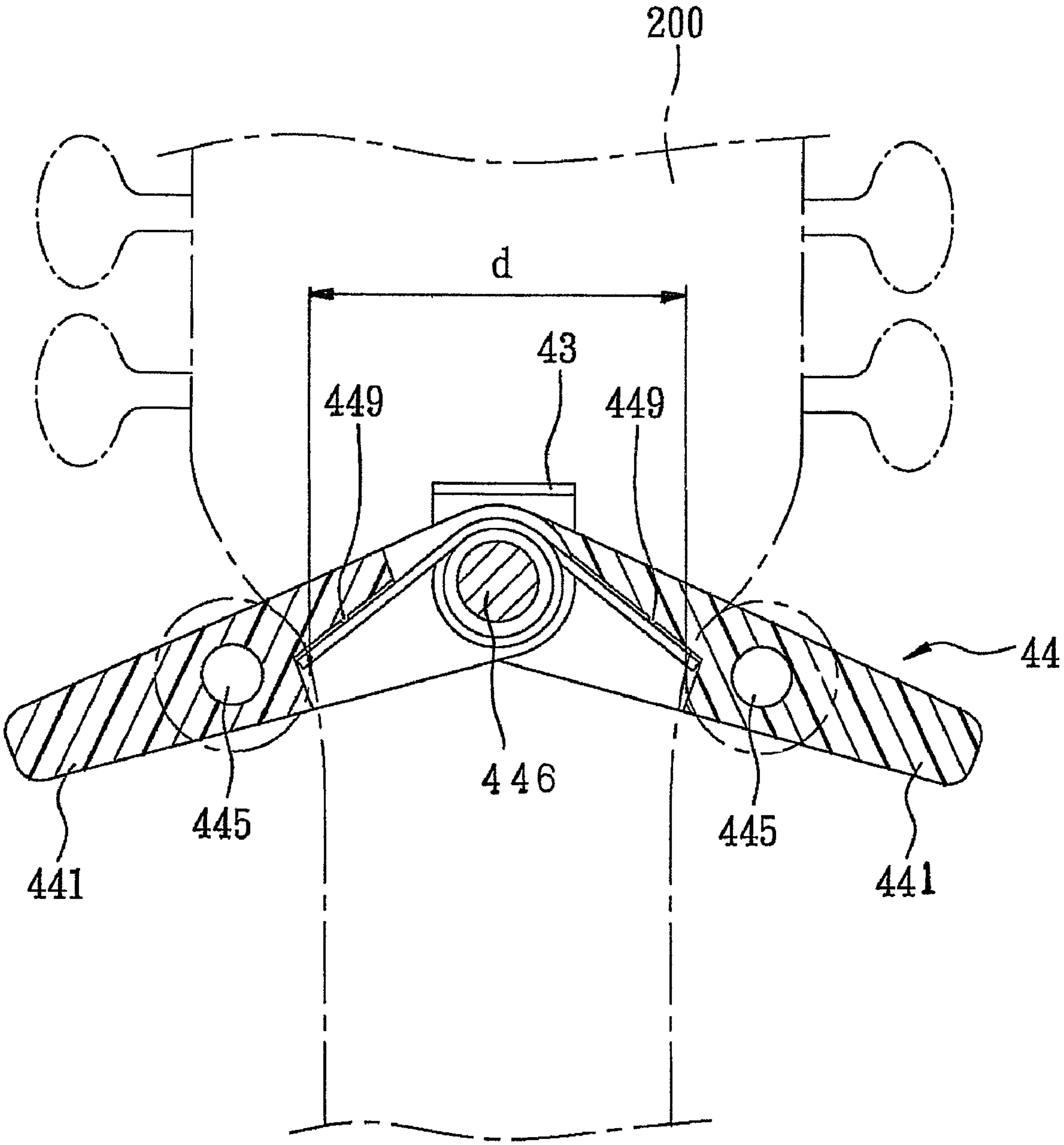
FIG. 5 is a schematic operational view of the musical instrument stand as shown in FIG. 4.

In practice, the two pivot members 441 of the holding unit 44 are movable relative to the pivot rod 446 (or the pivot fulcrum) between an expanding position as shown in FIG. 4 where the two holding rods 445 of the holding unit 44 are movable to space from each other and a holding position as shown in FIG. 5 where the two holding rods 445 of the holding unit 44 are movable to approach each other. The torsion spring 443 of the holding unit 44 provides an elastic force to the two pivot members 441 of the holding unit 44 so that the two pivot members 441 of the holding unit 44 are disposed at the expanding position at a normal state. Thus, the distance "D" between the two holding rods 445 of the holding unit 44 disposed at the expanding position is greater than the distance "d" between the two holding rods 445 of the holding unit 44 disposed at the holding position. When the two pivot members 441 of the holding unit 44 are disposed at the expanding position, the two pivot members 441 of the holding unit 44 are in line with each other, and when the two pivot members 441 of the holding unit 44 are disposed at the holding position, the two pivot members 441 of the holding unit 44 are inclined relative to each other.

As shown in FIG. 5, when the neck of the musical instrument 200 is placed between the two holding rods 445 of the holding unit 44, the weight of the musical instrument 200 overcomes the elastic force of the torsion spring 443 of the holding unit 44 so that the two pivot members 441 of the holding unit 44 are moved downward to the holding position, and the two holding rods 445 of the holding unit 44 are moved to approach each other to hold the neck of the musical instrument 200.

As shown in FIG. 4, when the musical instrument 200 is pulled upward relative to the holding unit 44 to detach from the two holding rods 445 of the holding unit 44, the two pivot members 441 of the holding unit 44 are pushed upward by the restoring force of the torsion spring 443 of the holding unit 44 so that the two pivot members 441 of the holding unit 44 are moved upward to the expanding position, and the two holding rods 445 of the holding unit 44 are moved to space from each other such that the neck of the musical instrument 200 can be removed from the two holding rods 445 of the holding unit 44 easily and conveniently.

Figure 6:
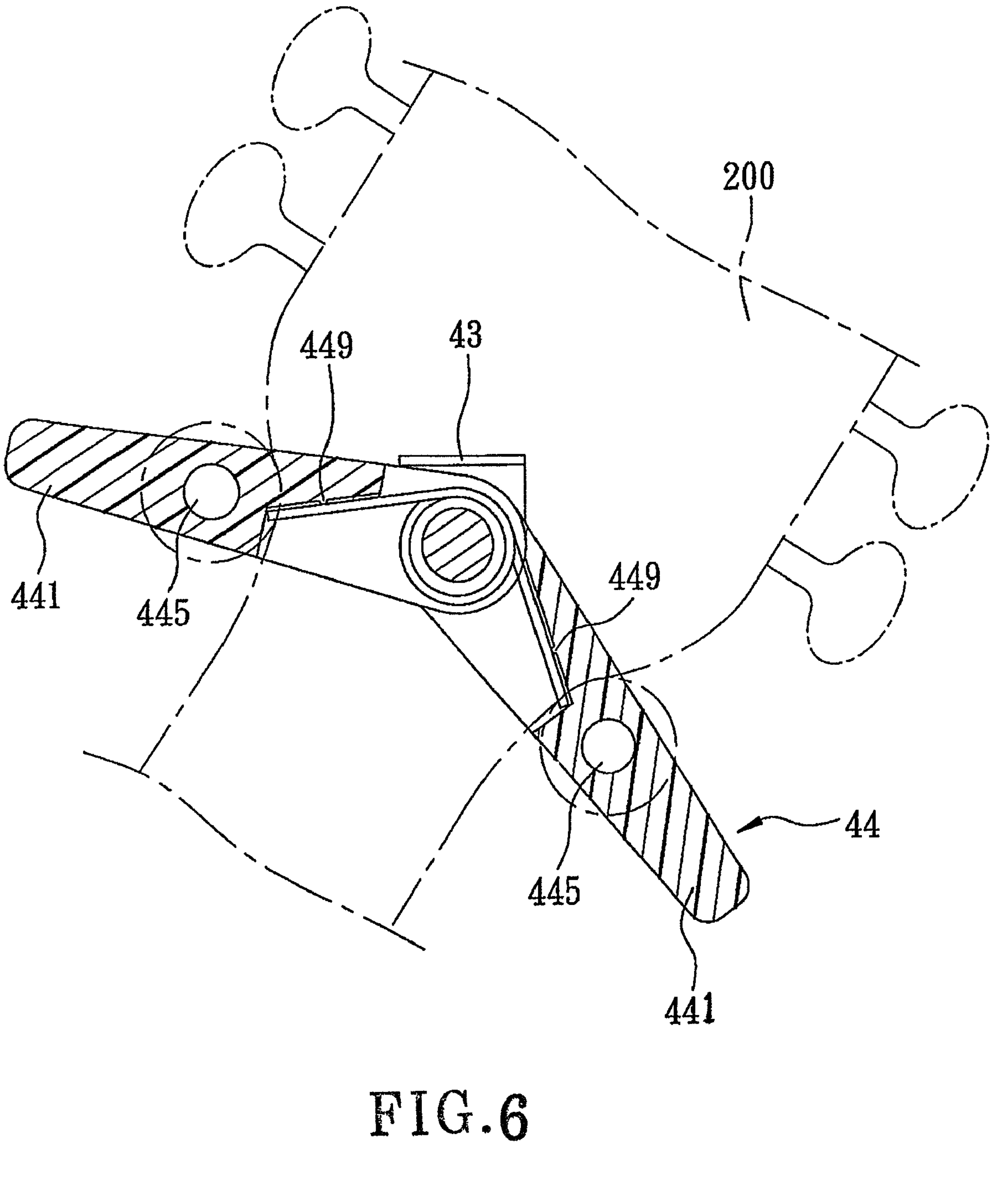
FIG. 6 is a schematic operational view of the musical instrument stand as shown in FIG. 4.
Figure 7:
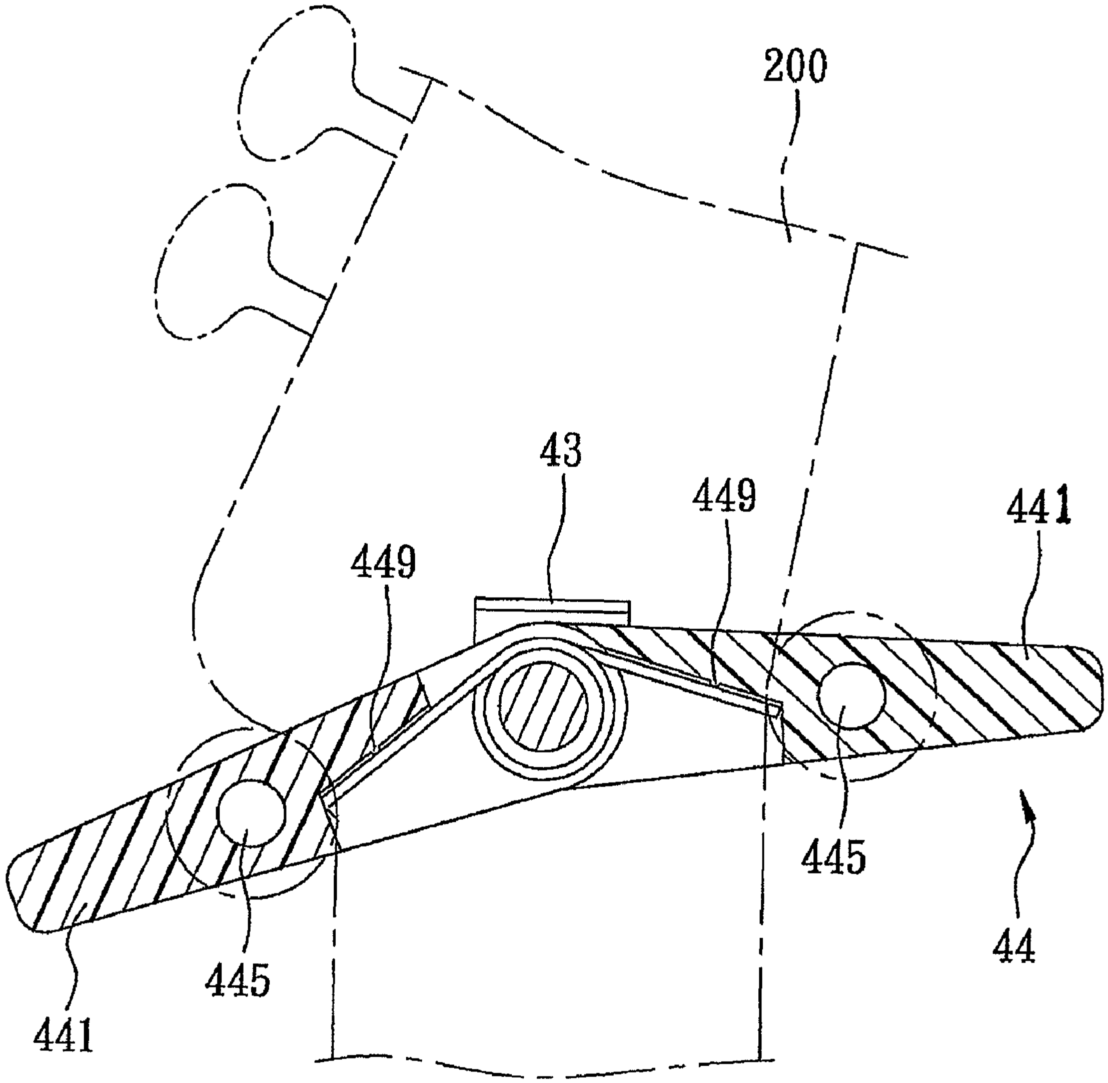
FIG. 7 is a schematic operational view of the musical instrument stand as shown in FIG. 4.

As shown in FIGS. 6 and 7, when the neck of the musical instrument 200 is placed between the two holding rods 445 of the holding unit 44, the holding unit 44 may be pivoted relative to the limit member 43 due to an unevenly distributed force. At this time, the two pivot members 441 of the holding unit 44 are movable to abut the limit member 43 during movement of the holding unit 44 relative to the limit member 43 so that movement of the holding unit 44 is limited by the limit member 43 until the holding unit 44 reaches a balanced state.

Figure 8:
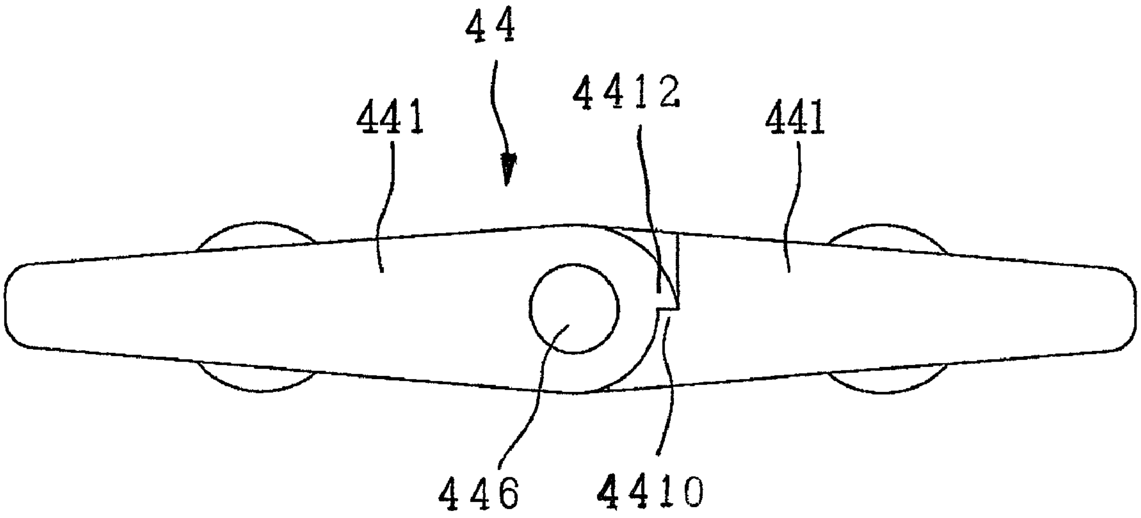
FIG. 8 is a front cross-sectional view of the musical instrument stand as shown in FIG. 2.

Referring to FIG. 8, a first one of the two pivot members 441 of the holding unit 44 has a side provided with a limit groove 4410, and a second one of the two pivot members 441 of the holding unit 44 has a side provided with a protruding limit rib 4412 that is movable to abut the limit groove 4410 of the first one of the two pivot members 441 when the two pivot members 441 of the holding unit 44 are disposed at the holding position.

Figure 9:
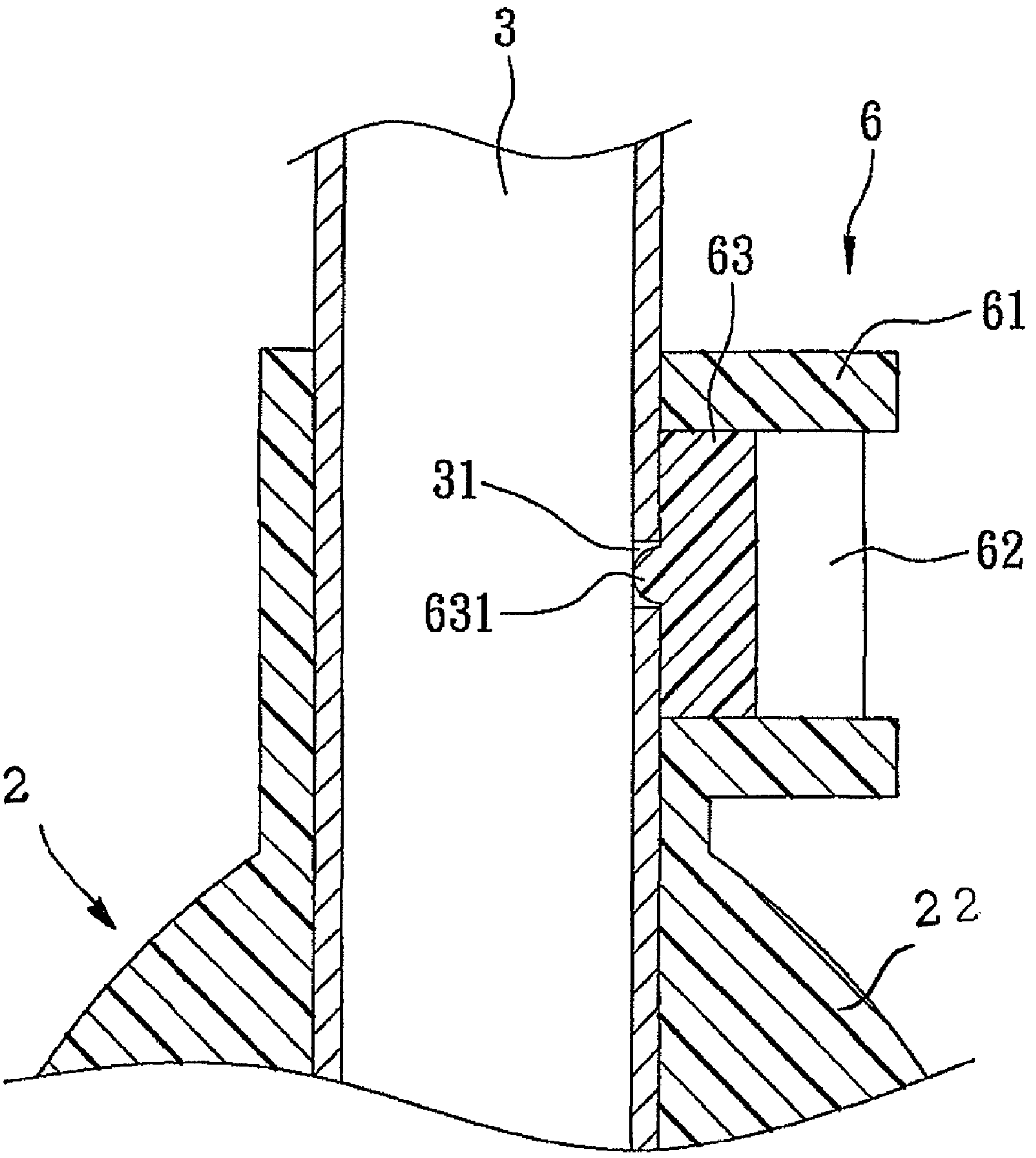
FIG. 9 is a locally enlarged front cross-sectional view of the musical instrument stand as shown in FIG. 1.
Figure 10:
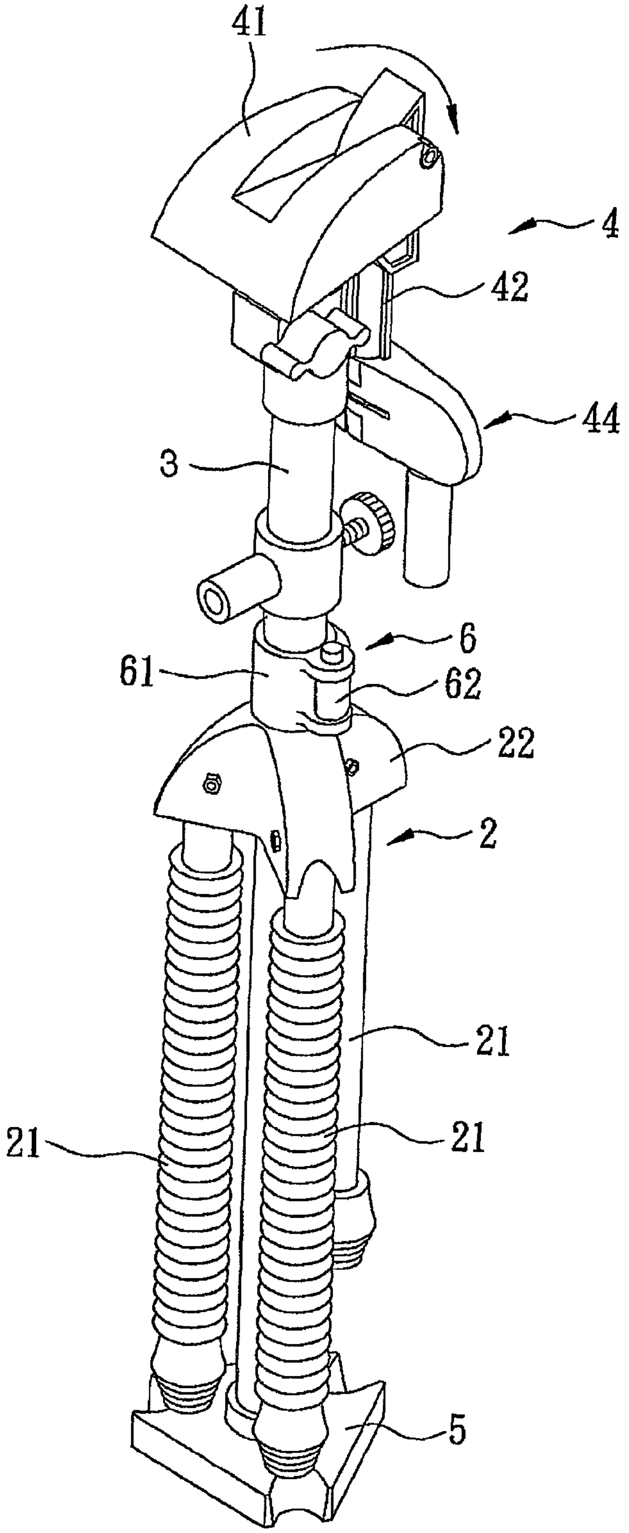
FIG. 10 is a perspective folded view of the musical instrument stand as shown in FIG. 1.

Referring to FIGS. 1, 9 and 10, the quick release 6 is mounted between the main rod 3 and the base 2 and includes a fixing seat 61 secured on a top of the base 2 and mounted on the main rod 3, and a drive handle 62 pivotally mounted on the fixing seat 61 and provided with a pressing block 63 that is movable to press the main rod 3 so as to position the main rod 3 onto the fixing seat 61 and the base 2. The main rod 3 extends through and is movably mounted on the base 2 and the fixing seat 61 of the quick release 6. The main rod 3 has a periphery provided with at least one locking hole 31, and the pressing block 63 of the drive handle 62 of the quick release 6 has a periphery provided with a locking boss 631 detachably locked in the locking hole 31 of the main rod 3 to lock the main rod 3 onto the fixing seat 61 of the quick release 6 and the base 2 so as to prevent the main rod 3 from being movable relative to the fixing seat 61 of the quick release 6 and the base 2. The urging member 5 is mounted on a bottom of the main rod 3 to move in concert with the main rod 3. The urging member 5 is located under the mounting member 22 of the base 2 and is located between the support legs 21 of the base 2 to push the support legs 21 of the base 2 outwardly relative to the mounting member 22 of the base 2 as shown in FIG. 1.

When in use, the extension bar 42 of the top seat 4 is movable relative to the seat body 41 until the holding unit 44 is parallel with the main rod 3 as shown in FIG. 10 so as to fold the top seat 4. Then, the drive handle 62 of the quick release 6 is pivoted outwardly relative to the fixing seat 61 to detach the locking boss 631 of the pressing block 63 from the locking hole 31 of the main rod 3 and to release the pressing block 63 of the drive handle 62 from the main rod 3 so that the main rod 3 is movable downward relative to the base 2 and the fixing seat 61 of the quick release 6, and the urging member 5 is movable downward relative to the base 2 to detach from the support legs 21 of the base 2 as shown in FIG. 10 so as to fold the support legs 21 of the base 2.

Figure 11:
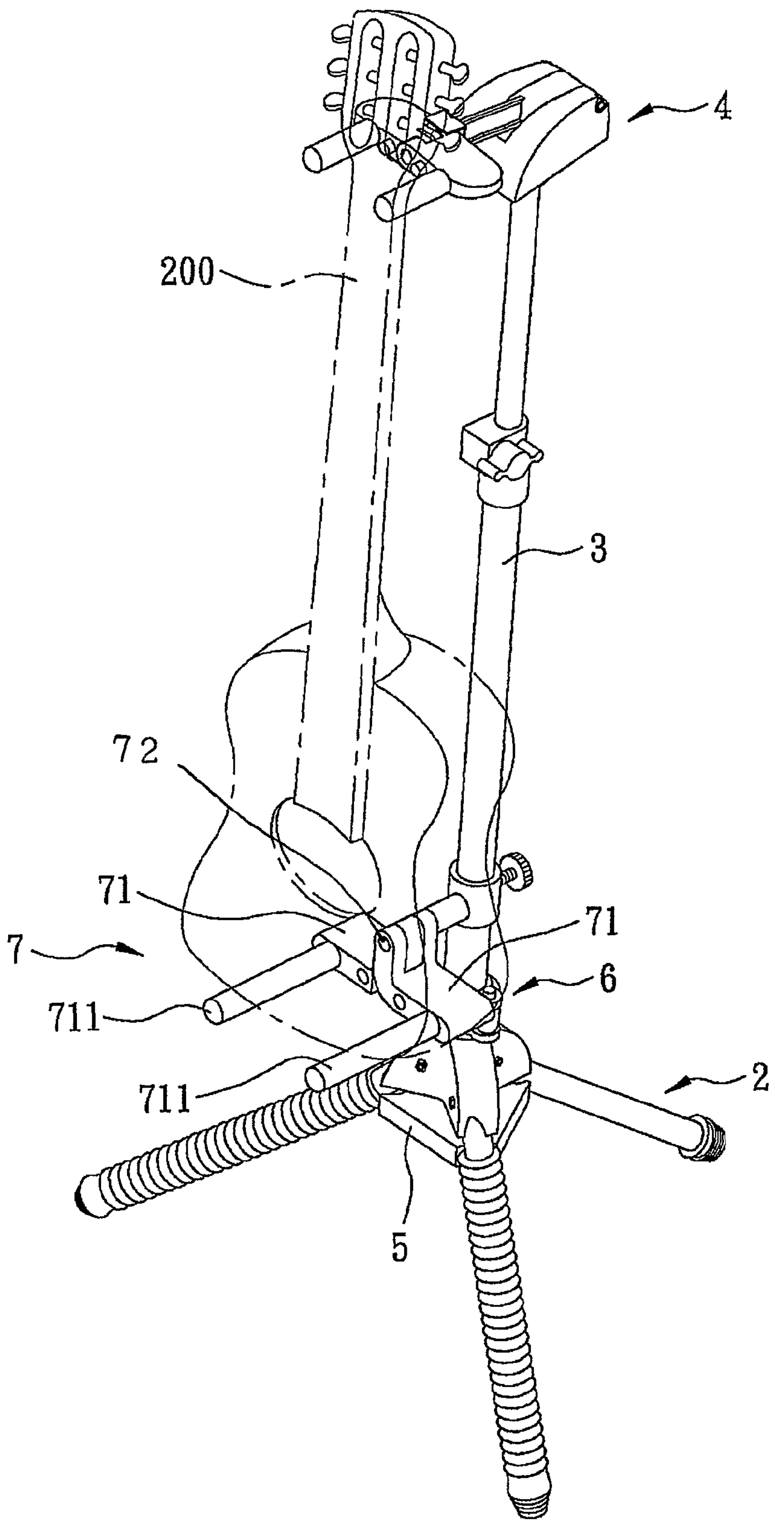
FIG. 11 is a perspective view of a musical instrument stand in accordance with another preferred embodiment of the present invention.
Figure 12:
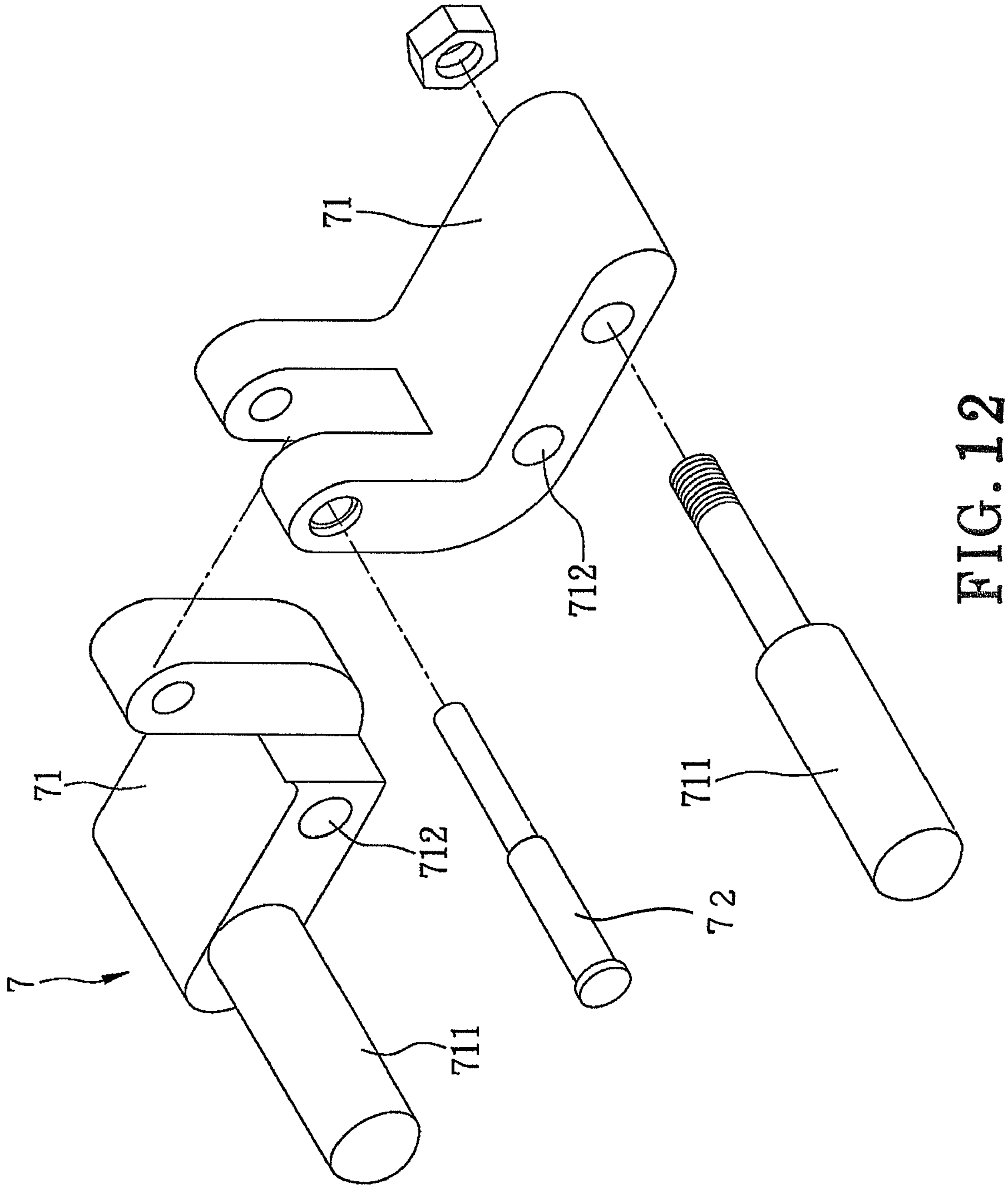
FIG. 12 is an exploded perspective view of a support unit of the musical instrument stand as shown in FIG. 11.
Figure 13:
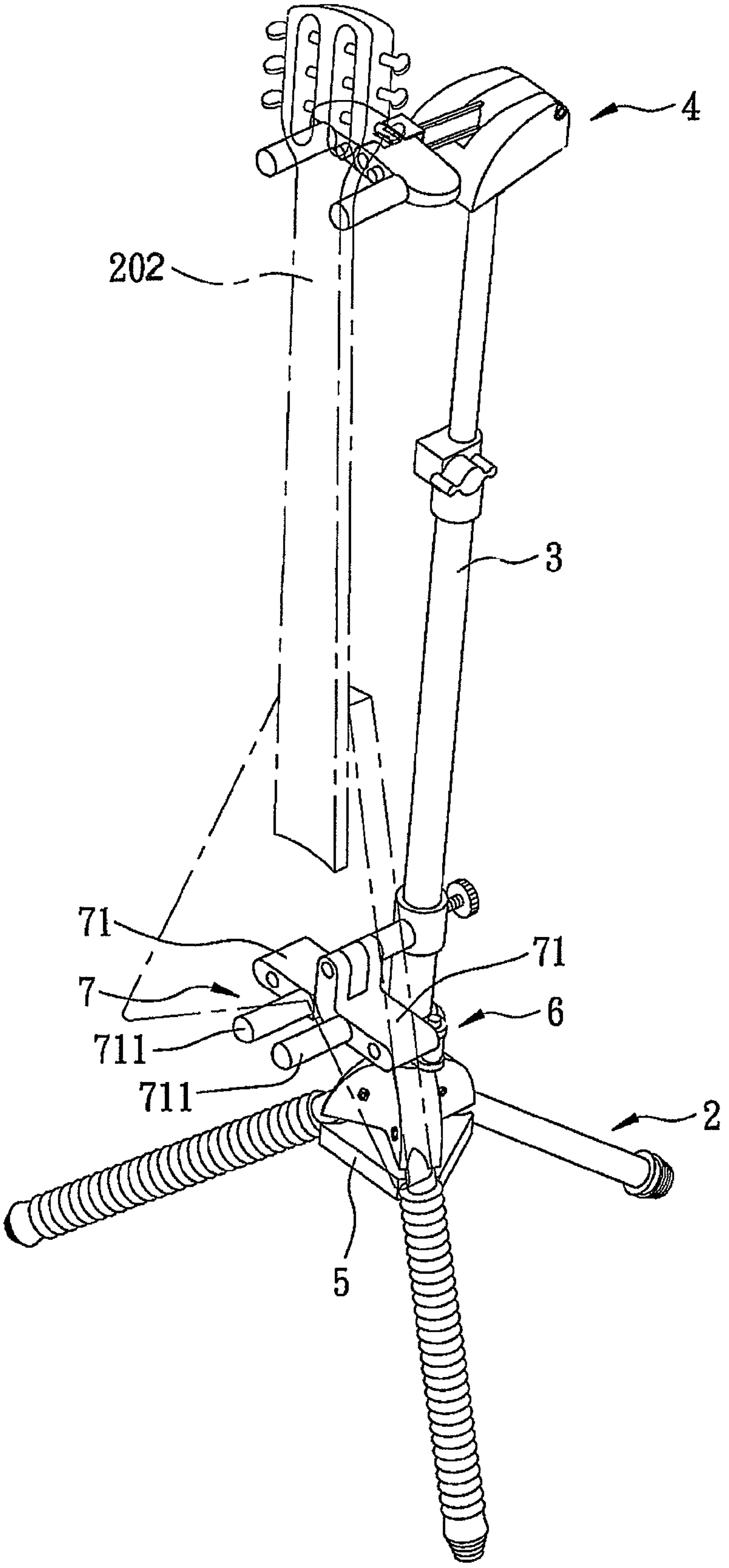
FIG. 13 is a schematic operational view of the musical instrument stand as shown in FIG. 11.

Referring to FIGS. 11-13, the musical instrument stand further comprises a support unit 7 mounted on the main rod 3 and located between the base 2 and the top seat 4 to support a bottom of the musical instrument 200 and includes two support brackets 71 pivotally connected with each other, and two support rods 711 each adjustably mounted on a respective one of the two support brackets 71 to support the bottom of the musical instrument 200. Each of the two support brackets 71 of the support unit 7 has a side provided with at least two mounting holes 712, and each of the two support rods 711 of the support unit 7 has a distal end selectively mounted in any one of the at least two mounting holes 712 of the respective support bracket 71 so that the distance between the two support rods 711 of the support unit 7 is adjustable as shown in FIGS. 11 and 13 to fit the musical instruments 200 and 202 of different shapes and sizes. The two support brackets 71 of the support unit 7 are pivotally connected with each other by a pivot pin 72 which has a distal end mounted on the main rod 3.

Figure 14:
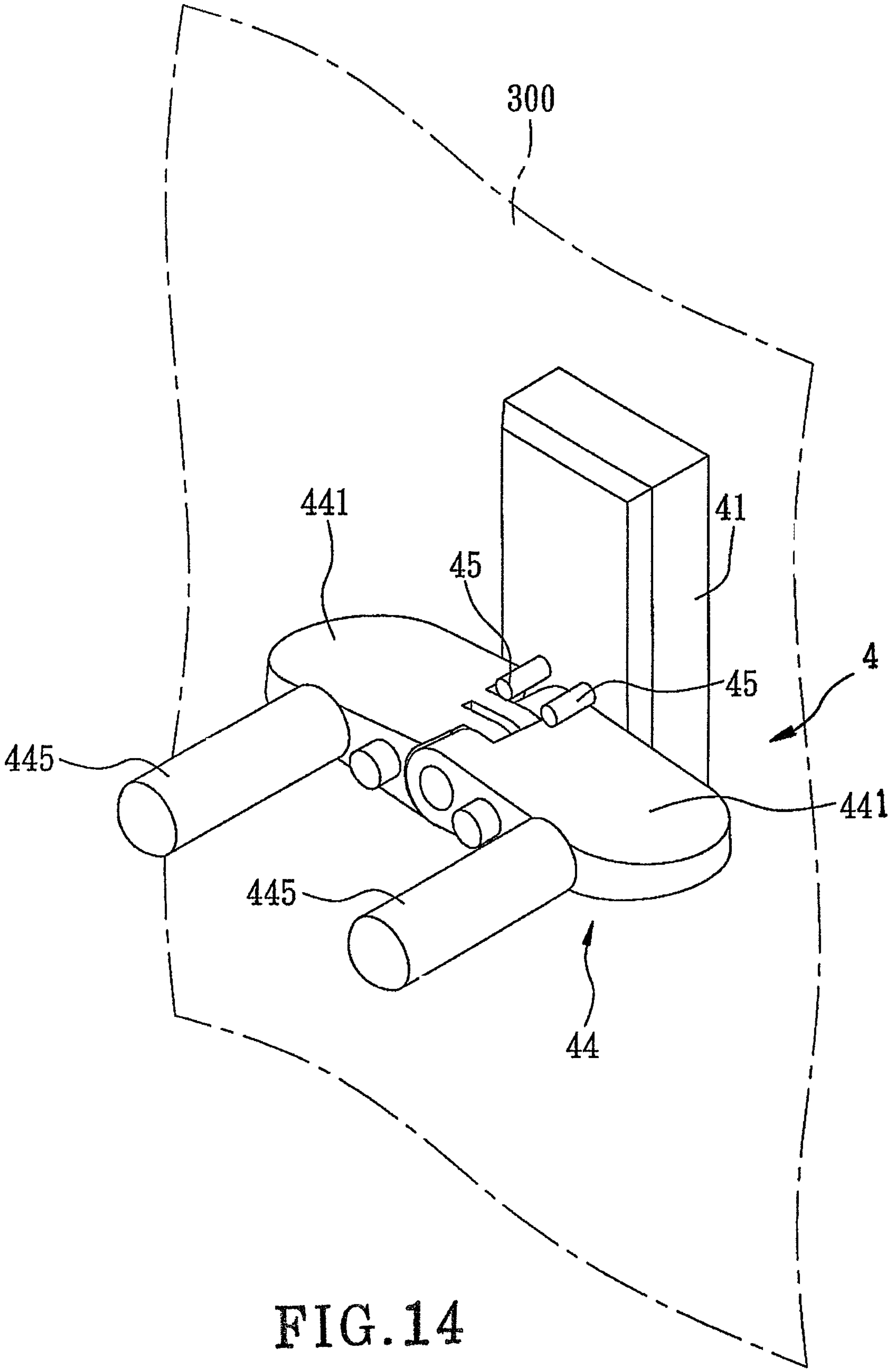
FIG. 14 is a perspective view of a musical instrument stand in accordance with another preferred embodiment of the present invention.
Figure 15:
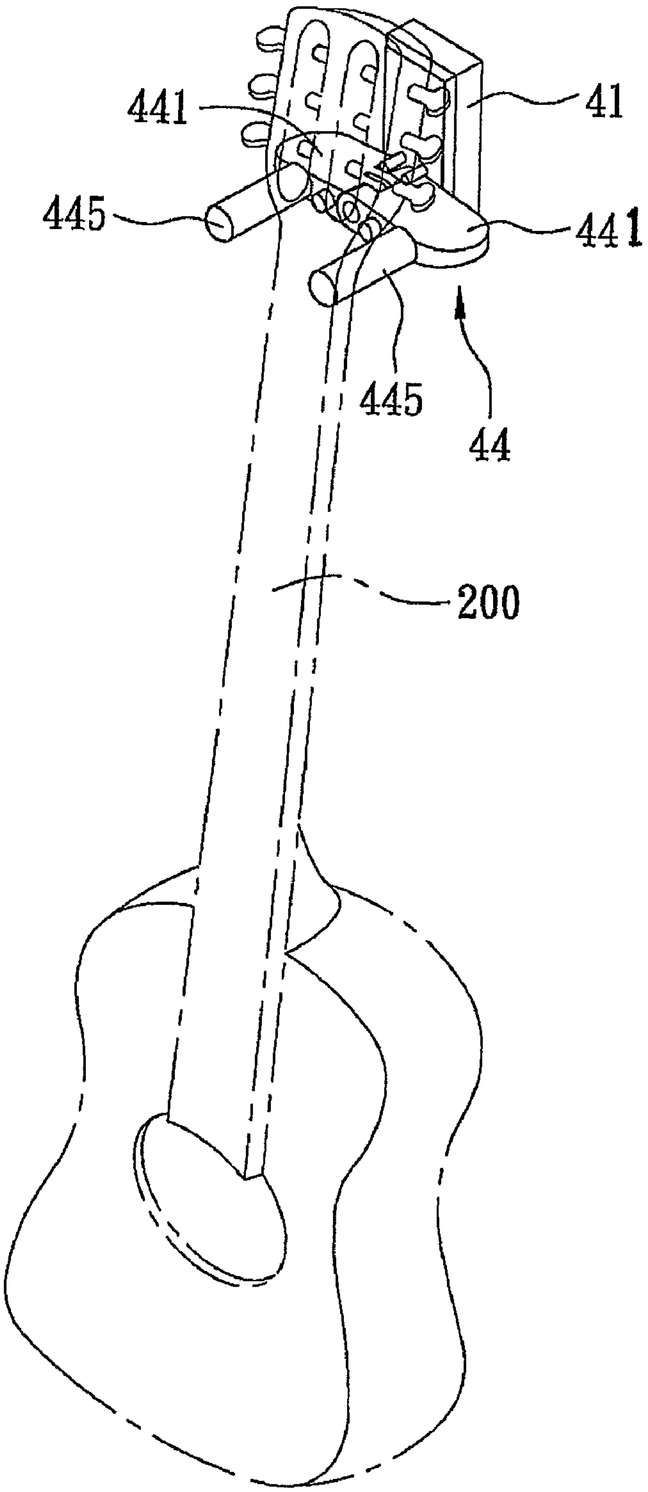
FIG. 15 is a schematic operational view of the musical instrument stand as shown in FIG. 14.
Figure 16:
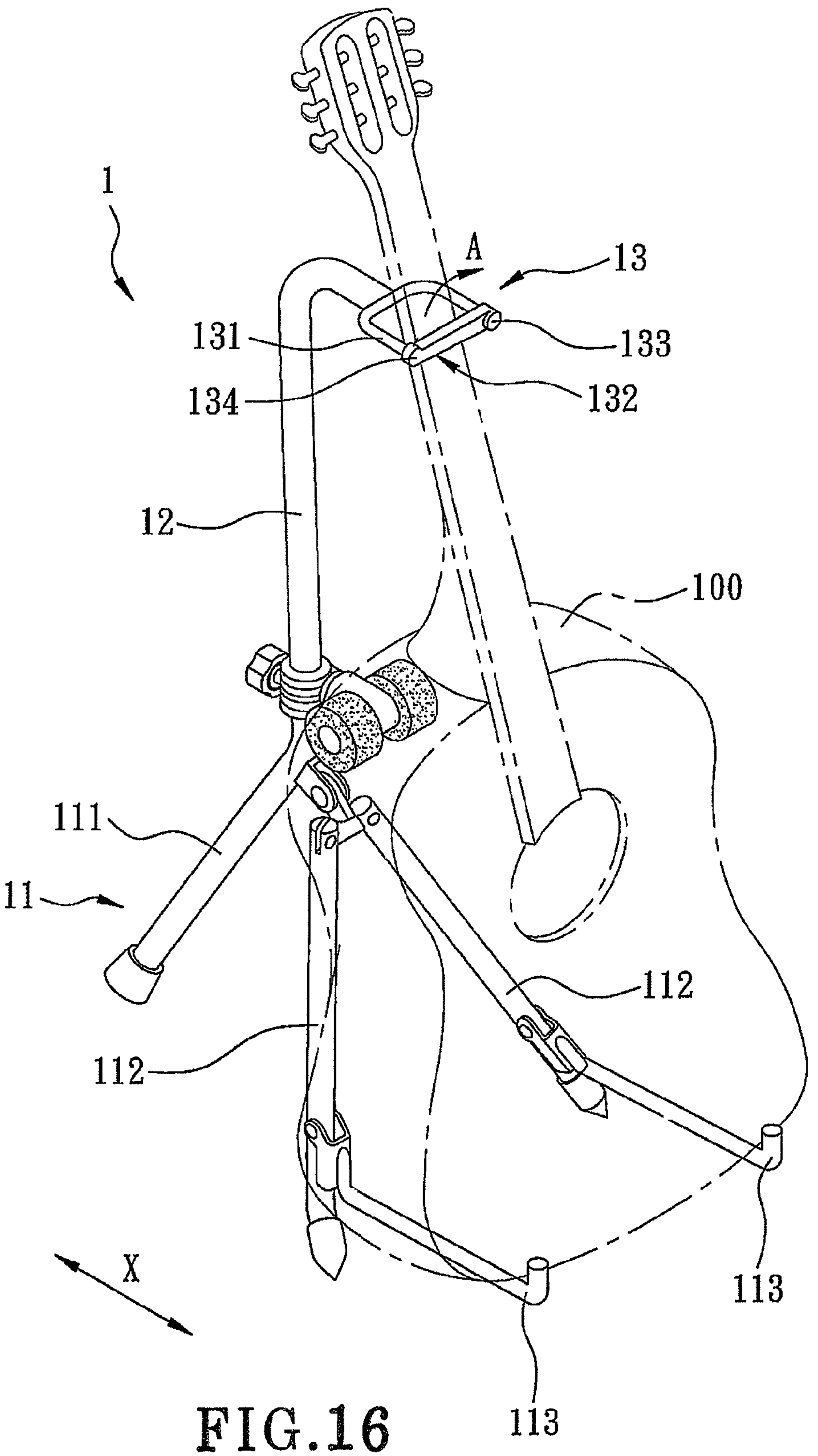
FIG.16 PRIOR ART
FIG. 16 is a perspective view of a conventional musical instrument stand in accordance with the prior art.

Referring to FIGS. 14 and 15, the seat body 41 of the top seat 4 is secured on a vertical wall 300. The top seat 4 further includes two limit rods 45 each mounted on the seat body 41 and each located above the holding unit 44 to limit movement of the holding unit 44. Each of the two limit rods 45 of the top seat 4 is located above a respective one of the two pivot members 441 of the holding unit 44 and spaced from a top of the respective pivot member 441 of the holding unit 44 to limit movement of the respective pivot member 441 of the holding unit 44.

Accordingly, the holding unit 44 holds the neck of the musical instrument 200, and the support unit 7 supports the bottom of the musical instrument 200, so that the musical instrument 200 is positioned on the musical instrument stand solidly and stably. In addition, when the musical instrument 200 is pulled upward relative to the holding unit 44 to detach from the two holding rods 445 of the holding unit 44, the two pivot members 441 of the holding unit 44 are pushed upward by the restoring force of the torsion spring 443 of the holding unit 44 so that the two pivot members 441 of the holding unit 44 are moved upward to the expanding position, and the two holding rods 445 of the holding unit 44 are moved to space from each other such that the neck of the musical instrument 200 can be removed from the two holding rods 445 of the holding unit 44 easily and conveniently.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A musical instrument stand, comprising:

a top seat including:

a seat body;

a holding unit pivotally connected with the seat body to hold a neck of a musical instrument;

wherein the holding unit of the top seat includes:

two pivot members pivotally connected with each other;

a torsion spring biased between the two pivot members;

two holding rods each mounted on a respective one of the two pivot members to move in concert with the respective pivot member and to hold the neck of the musical instrument;

the holding unit of the top seat includes a pivot fulcrum between the two pivot members;

the two pivot members of the holding unit are movable relative to the pivot fulcrum between an expanding position where the two holding rods of the holding unit are movable to ,space from each other and a holding position where the two holding rods of the holding unit are movable to approach each other;

the torsion spring of the holding unit provides an elastic force to the two pivot members of the holding unit so that the two pivot members of the holding unit are disposed at the expanding position at a normal state;

the holding unit of the top seat further includes a pivot rod extending through the two pivot members to pivotally connect the two pivot members;

the pivot rod of the holding unit is located between the two pivot members to function as the pivot fulcrum of the two pivot members;

a first one of the two pivot members of the holding unit has a side provided with a receiving recess;

a second one of the two pivot members of the holding unit has a side provided with a protruding pivot ear inserted into and pivotally mounted in the receiving recess of the first one of the two pivot members;

the pivot rod of the holding, unit extends through the receiving recess of the first one of the two pivot members and the pivot ear of the second one of the two pivot members; and wherein each of the two pivot members of the holding unit has a bottom provided with a protruding limit boss abutting the torsion spring.

2. The musical instrument stand of claim 1, wherein the holding unit of the top seat further includes:

two cushion pads each mounted on a respective one of the two pivot members.

3. The musical instrument stand of claim 2, wherein the top seat further includes:

an extension bar pivotally and foldably mounted on the seat body and located between the seat body and the holding unit to support the holding unit;

a limit member mounted on the extension bar and located above the holding unit to limit movement of the holding unit;

the holding unit of the top seat is pivotally mounted on the extension bar of the top seat;

the limit member of the top seat is located above the two pivot members of the holding unit and spaced from a top of each of the two pivot members of the holding unit to limit movement of the two pivot members of the holding unit.

4. A musical instrument stand, comprising:

a top seat including:

a seat body;

a holding unit pivotally connected with the seat body to hold a neck of a musical instrument;

wherein the holding unit of the top seat includes:

two pivot members pivotally connected with each other:

a torsion spring biased between the two pivot members;

two holding rods each mounted on a respective one of the two pivot members to move in concert with the respective pivot member and to hold the neck of the musical instrument;

the musical instrument stand further comprises:

a base;

a main rod mounted on the base;

wherein the top seat is mounted on a top of the main rod;

the seat body of the top seat is secured on the top of the main rod;

the musical instrument stand further comprises:

a support unit mounted on the main rod and located between the base and the top seat to support a bottom of the musical instrument and including:

two support brackets pivotally connected with each other;

two support rods each adjustably mounted on a respective one of the two support brackets to support the bottom of the musical instrument;

wherein the two support brackets of the support unit are pivotally connected with each other by a pivot pin which has a distal end mounted on the main rod;

wherein the to seat further includes two limit rods each mounted on the seat body and each located above the holding unit to limit movement of the holding unit; and each of the two limit rods of the top seat is located above a respective one of the two pivot members of the holding unit and spaced from a top of the respective pivot member of the holding unit to limit movement of the respective pivot member of the holding unit.

5. The musical instrument stand of claim 4, further comprising:

a quick release mounted between the main rod and the base and including:

a fixing seat secured on a top of the base and mounted on the main rod;

a drive handle pivotally mounted on the fixing seat and provided with a pressing block that is movable to press the main rod so as to position the main rod onto the fixing seat and the base.

6. The musical instrument stand of claim 5, wherein the main rod extends through and is movably mounted on the base and the fixing seat of the quick release;

the main rod has a periphery provided with at least one locking hole;

the pressing block of the drive handle of the quick release has a periphery provided with a locking boss detachably locked in the locking hole of the main rod to lock the main rod onto the fixing seat of the quick release and the base so as to prevent the main rod from being movable relative to the fixing seat of the quick release and the base.

7. The musical instrument stand of claim 4, wherein each of the two support brackets of the support unit has a side provided with at least two mounting holes;

each of the two support rods of the support unit has a distal end selectively mounted in any one of the at least two mounting holes of the respective support bracket so that a distance between the two support rods of the support unit is adjustable.

8. The musical instrument stand of claim 4, wherein the base includes a mounting member and a plurality of support legs each pivotally mounted on the mounting member;

the mounting member of the base is located between the support legs of the base.

9. The musical instrument stand of claim 8, wherein the main rod extends through and is movably mounted on the base and the fixing seat of the quick release;

the musical instrument stand further comprises an urging member mounted on a bottom of the main rod to move in concert with the main rod;

the urging member is located under the mounting member of the base and is located between the support legs of the base to push the support legs of the base outwardly relative to the mounting member of the base.

10. The musical instrument stand of claim 3, wherein the limit member of the top seat is integrally formed on and extends outwardly from the extension bar;

the limit member of the top seat has a substantially inverted L-shaped profile.

11. The musical instrument stand of claim 3, wherein the pivot rod of the holding unit has a distal end inserted into and secured in the extension bar of the top seat;

the pivot rod of the holding unit is located between the two holding rods and is located between the two cushion pads;

the two cushion pads of the holding unit are located between the two holding rods; the torsion spring of the holding unit is mounted on the pivot rod.

12. The musical instrument stand of claim 1, wherein a distance between the two holding rods of the holding unit disposed at the expanding position is greater than the distance between the two holding rods of the holding unit disposed at the holding position;

when the two pivot members of the holding unit are disposed at the expanding position, the two pivot members of the holding unit are in line with each other; when the two pivot members of the holding unit are disposed at the holding position, the two pivot members of the holding unit are inclined relative to each other.

* * * * *